Feb. 19, 1924. 1,484,214
L. W. GATES
SEPARABLE FASTENER
Filed Jan. 2, 1923

INVENTOR
Louis W. Gates
BY
Wooster V. Davis
ATTORNEYS

Patented Feb. 19, 1924.

1,484,214

UNITED STATES PATENT OFFICE.

LOUIS W. GATES, OF NEW HAVEN, CONNECTICUT, ASSIGNOR TO C. COWLES & COMPANY, OF NEW HAVEN, CONNECTICUT, A CORPORATION OF CONNECTICUT.

SEPARABLE FASTENER.

Application filed January 2, 1923. Serial No. 610,181.

*To all whom it may concern:*

Be it known that I, LOUIS W. GATES, a citizen of the United States, residing at New Haven, county of New Haven, State of Connecticut, have invented an Improvement in Separable Fasteners, of which the following is a specification.

This invention relates to fasteners for general use and especially for securing curtains, bags, clothing and so forth, and it is an object of the invention to provide a separable fastener which when secured is positively locked and cannot be separated by pressure on the members secured together but which may, however, be easily separated when desired.

It is also an object of the invention to provide a fastener of this type which is simple in construction and cannot get out of order, which may be easily and quickly applied to the member to be secured and which will be neat in appearance.

With the foregoing and other objects in view I have devised the construction illustrated in the accompanying drawing, in which—

Figure 1:
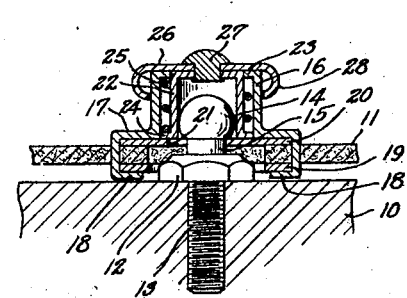
Fig. 1 is a transverse section through one form of fastener as applied to an automobile curtain showing the same in locked position.

Referring to Figs. 1 to 4 inclusive I have shown the device as applied to an automobile curtain for securing this curtain to the body of the automobile, but it will be apparent that it is by no means confined to this specific use as it is of general application where it is desired to separably secure together two different elements. In the application shown the body of the car is represented at 10 and the curtain at 11. Secured to the body 10 by any suitable means, as screw threaded engagement and a lock nut 12, is a stud 13 having an enlarged head 14 preferably of general spherical shape, and a neck 15 of smaller diameter than the head. This shape will give a curved or inclined shoulder on the underside thereof. Secured to the curtain 11 is a body or casing 16 preferably substantially cylindrical, and having an annular flange 17 provided with integral lugs 18 adapted to be forced through the curtain and clinched over on the underside thereof to secure the casing to the curtain. An annular washer 19 is preferably placed between these lugs and the curtain to give a better holding effect and prevent tearing of the curtain by these lugs. Also clamped between the surface of the curtain and the flange 17 is a second washer 20 provided with an eccentric opening 21 of a diameter sufficient to allow passage of the head 14 of the stud 13. Mounted to reciprocate within the cylindrical portion of the body or casing 16 is a tube 22 open at its inner end to receive the head 14 and with its body portion spaced from the body of the casing by flanges 23 and 24 carried by the casing and the tube respectively and adapted to guide the tube for longitudinal movement within the casing. Between the tube and the casing and bearing at its opposite ends on these flanges is a coiled spring 25 tending to hold the tube inwardly against the washer 20, as shown in Fig. 1. Suitable means is provided to be gripped by the operator for drawing this tube outwardly against the action of the spring, such for instance as the cup shaped member 26 secured to the end of the tube by suitable means as a rivet 27, and having its sides curved outwardly and downwardly, as shown at 28, to embrace the outer walls of the casing 16. This peculiar shape provides a sufficient holding means to be easily gripped by the operator without materially increasing the height of the fastener.

Figure 2:
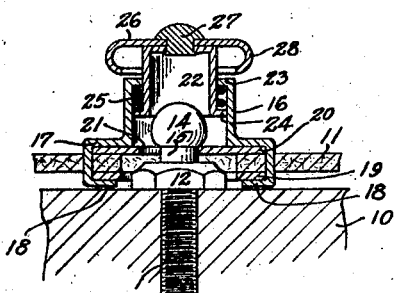
Fig. 2 is a similar view showing the same unlocked so that the curtain may be separated from the car body.
Figure 4:
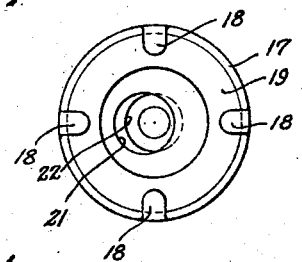
Fig. 4 is a bottom plan view of the portion of the fastener secured to the curtain.
Figure 3:
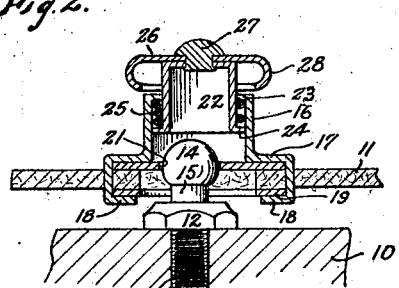
Fig. 3 is a similar view showing the elements partially separated.

The operation is as follows:

Assuming the fastener is closed, as shown in Fig. 1 the head 14 is above the washer 20, and one side of the neck 15 immediately beneath this head is held in engagement with the side of the eccentric opening 21 in washer 20 by the inner wall of the tube 22 engaging the side of the head at its largest diameter. It will thus be apparent that the stud is locked in engagement with the portion of the fastener secured to the curtain, and the only way the head may be withdrawn through the eccentric opening is that it should move laterally with respect to this opening so that the center of the head is in alignment with the center of the opening to allow the enlarged portion of this head to pass through the same, as shown in Fig. 3. With the tube 22, however, in its lower position, as shown in Fig. 1, it will be evident that pressure of the head on the inner wall of this tube is normal to the surface thereof, so that there is no possibility of pressure from this head pushing this tube upwardly to release the head if tension is placed on the stud or the curtain, and therefore, there is no possibility of pressure on the curtain releasing the fastener, and the elements are always positively locked together. As the opening 21 is eccentrically arranged with respect to the tube 22 the stud is allowed to assume a position concentric with the casing 16 when the elements are in securing position. If it is now desired to release the elements and to unlock the fastener, all that is necessary is to pull upwardly on the cup shaped member 26 and draw the tube 22 to a position above the head 14 as shown in Fig. 2. It will be apparent that the tube now no longer holds the head and neck 15 against movement laterally in the opening 21 and continued pulling movement on the member 26 will withdraw the portion of the fastener carried by the curtain from engagement with the stud, as shown in Fig. 3. The reaction of the curved portion of the head with the edge of the opening causes the lateral movement between the elements required. In securing the curtain all that is necessary is to press the head of the stud upwardly through the eccentric opening 21 by pressing on the curtain or the fastener. Engagement of this head with the lower portion of the tube 22 will force this tube upwardly against the action of the spring 25 when the head will pass through the opening. Immediately the head has passed through the opening, reaction of the lower end of the tube with the upper curved portion of the head under the action of spring 25 will force the head laterally to the securing position shown in Figs. 1 and 2 and the tube will be returned to its lower or locking position, as shown in Fig. 1. The fastener is thus automatic in its attaching operation.

Figure 5:
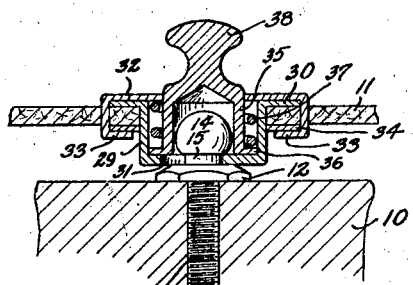
Fig. 5 is a view similar to Fig. 1 showing a slightly different construction.
Figure 6:
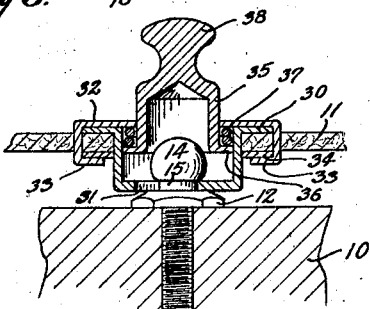
Fig. 6 is a similar view of the construction shown in Fig. 5 showing it unlocked.
Figure 7:
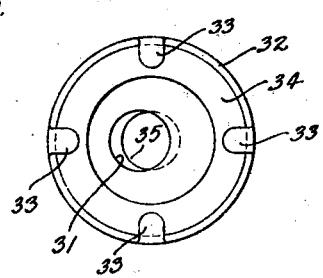
Fig. 7 is a bottom plan view of the curtain portion of the fastener shown in Figs. 5 and 6.

Referring to the construction shown in Figs. 5, 6 and 7, the principle is exactly the same, the stud 13 being the same as that used in the first form, the other portion of the fastener, carried by the curtain, however, being somewhat different. A body or casing 29 has a cylindrical portion extending through the curtain with a flange 30 on the upper side thereof, and its lower end is closed except for the eccentric spaced opening 31, this opening being of a diameter to allow passage of the head of the stud and corresponding to the opening 21 in the first form. The casing is secured in position by means of a washer 32 engaging the surface of the flange 30 and provided with prongs 33 adapted to extend through the curtain and be clinched over on the under side thereof. I preferably place between these prongs and the curtain a washer 34 to give a better holding effect and prevent tearing of the curtain. The tube 35 corresponding to tube 22 of the first form is guided in an opening in the washer 32 and has an outwardly extending flange 36 bearing on the inner wall of the body member 29, and is guided for longitudinal movement by these two elements. A spring 37 embraces the tube and bears at its opposite ends on washer 32 and flange 36 and tends to force the tube downwardly against the lower end of the body member 29 to the position shown in Fig. 5, which is the locking position. To facilitate operation of this tube it is provided at its outer end with a suitable knob 38.

The operation of this form is exactly the same as that of the first form shown in Figs. 1 to 4. The head 14 projects through and above the eccentric opening 31 and is held with the side of the neck 15 against the edge of this opening by pressure of the inner wall of the tube 35 against the side of the head, as shown in Fig. 5, and exactly the same as the head is held in Fig. 1. The unlocking operation also is exactly the same. By merely pulling outwardly on the knob 38, tube 35 is raised to the position shown in Fig. 6 releasing the head of the stud, and further pull on this element pulls the curtain away from the stud, the same as in the first form. This form will also close automatically exactly the same as described in connection with the first form.

The form shown in Figs. 5, 6 and 7 is somewhat simpler in construction than that shown in Figs. 1 to 4, but it does not allow the curtain to be placed as close to the surface of the body 10 as does the first form, as will be apparent from an inspection of Figs. 1 and 5.

It will be apparent from the foregoing description that this fastener does not require any special placing of either member except that they register, thus saving time in attaching, also the possibility of its getting out of order is very remote. Further as the elements are locked in engagement by the action of the spring, there is no rattling, which is important in use on an automobile. It will be still further apparent that the movable member is easily attached and detached to and from the stationary member, and that it can only be released by pulling on the cup 26 or knob 38 and therefore, it cannot be released by pressure of any kind upon the curtain. On the other hand it may be easily released or unlocked by pulling on these members 26 and 38, which is a straight pull outward, and this same pull will as soon as the head of the stud is released, draw the curtain away from the stationary element.

Having thus set forth the nature of my invention, what I claim is:

1. In a fastener for two separable members, an element carried by one of said members having a head, an element carried by the other member and adapted to engage the first element beneath said head to prevent separation of said members, and means engaging said head to hold said elements in engagement and movable longitudinally of the head to allow separation of said elements.

2. A separable fastener comprising two elements provided with coacting shoulders adapted for engagement by relative lateral movement, and means connected with one of said elements and adapted to engage the other element to hold said elements in engagement, said means being movable in a direction transverse to the direction of said relative lateral movement to allow separation of said elements.

3. A separable fastener comprising two elements provided with coacting shoulders adapted for engagement by successive relative longitudinal and lateral movements, and means connected with one of said elements and adapted to engage the other element to hold said elements in engagement, said means being movable in the general direction of said longitudinal movement to allow separation of said elements.

4. A separable fastener comprising two elements one of which has an opening therethrough and the other a head with a curved or inclined shoulder and adapted to pass through said opening, and means adapted to engage said head to hold the element against one side of the opening, said means being movable in a direction longitudinally of the head to allow separation of said elements.

5. A separable fastener comprising two elements provided with coacting shoulders adapted for engagement by relative lateral movement, means connected with one of said elements and engaging the other element to prevent reverse lateral movement to hold said elements in engagement, said means being movable in a direction transverse to the direction of said relative movement to allow separation of said elements, and a spring tending to move said means to the holding position.

6. A separable fastener comprising two elements provided with coacting shoulders adapted for engagement by successive relative longitudinal and lateral movements, means for holding said elements in engagement, said means being movable in the general direction of said longitudinal movement to allow separation of said elements, and a spring tending to move said means to the holding position.

7. A separable fastener comprising two elements one of which has an opening therethrough and the other a head with a curved or inclined shoulder and adapted to pass through said opening, means adapted to engage said head to hold the element against one side of the opening, said means being movable in a direction longitudinally of the head to allow separation of said elements, and a spring tending to move the said means to holding position.

8. In a fastener for two separable members, an element carried by one of said members having a substantially spherical head, an element carried by the other member having an opening therein adapted for passage of said head, a tubular member adapted to enclose said head and hold the element in engagement with one side of said opening, said tubular member being guided for longitudinal movement toward and from said head, and a spring tending to retain said tubular member in holding position.

9. In a fastener for two separable members, an element carried by one of said members having a substantially spherical head, an element carried by the other member having an opening therein adapted for passage of said head, a member adapted to engage said head to hold the element in engagement with one side of said opening, said member being movable toward and from said head in a direction longitudinally of said head, and yieldable means tending to move said member to holding position.

10. In a fastener for two separable members, an element carried by one of said members having a substantially spherical head, an element carried by the other member having an opening therein adapted for passage of said head, and a member having an opening adapted to receive said head and eccentrically arranged with respect to the said first opening, said latter member being movable toward and from said head in a direction longitudinally of said head.

11. In a fastener for two separable members, an element carried by one of said members having a substantially spherical head, an element carried by the other member having an opening therein adapted for passage of said head, a member having an opening adapted to receive said head and eccentrically arranged with respect to the said first opening, said latter member being movable toward and from said head in a direction longitudinally of said head, and spring means tending to move said member toward said head.

12. In a fastener for two separable members, an element carried by one of said members having a substantially spherical head, an element carried by the other member having an opening therein adapted for passage of said head, a tubular member adapted to enclose said head and eccentrically arranged with respect to said opening, said tubular member being guided for longitudinal movement toward and from said head, and a spring tending to move said member toward said head.

13. In a fastener for two separable members, an element carried by one of said members having a substantially spherical head, an element carried by the other member having an opening therein adapted for passage of said head, a tubular member adapted to enclose said head and hold the element in engagement with one side of said opening, said tubular member being guided for longitudinal movement toward and from said head, a spring tending to retain said tubular member in holding position, and means carried by the tubular member adapted to be gripped by an operator to withdraw said member from the head and release the same.

14. In a fastener for two separable members, an element carried by one of said members having a substantially spherical head, an element carried by the other member having an opening therein adapted for passage of said head, a tubular member adapted to enclose said head and eccentrically arranged with respect to said opening, said tubular member being guided for longitudinal movement toward and from said head, a spring tending to move said member toward said head, and means carried by the tubular member adapted to be gripped by an operator to withdraw said member from the head and release the same.

15. In a fastener for two separable members, an element carried by one of said members having a substantially spherical head, a casing secured to the other member, a tubular member guided for longitudinal movement in said casing and open at its inner end to receive said head, a washer across one side of said casing and having an opening adapted for passage of said head arranged eccentrically to said tubular member, a spring tending to force said tubular member toward said washer, and means carried by the tubular member whereby it may be withdrawn against the action of the spring to release the head.

16. A separable fastener comprising an element having a shoulder, a second element provided with a head having a shoulder adapted to engage the first shoulder by relative lateral movements of said elements, and means engaging said second element to hold said elements in engagement, said means being movable in a direction transverse to the direction of said relative lateral movement to allow separation of said elements.

17. A separable fastener comprising an element having a shoulder, a second element provided with a head having a shoulder adapted to engage the first shoulder by successive relative longitudinal and lateral movements, and means engaging said second element to hold said elements in engagement, said means being movable in the general direction of said longitudinal movement to allow separation of said elements.

In testimony whereof I affix my signature.

LOUIS W. GATES.